United States Patent
Tolle et al.

(10) Patent No.: US 8,838,966 B2
(45) Date of Patent: Sep. 16, 2014

(54) ONE-TIME USE AUTHORIZATION CODES WITH ENCRYPTED DATA PAYLOADS FOR USE WITH DIAGNOSTIC CONTENT SUPPORTED VIA ELECTRONIC COMMUNICATIONS

(75) Inventors: Joshua A. Tolle, Buhler, KS (US); Ty D. Klein, Hillsboro, KS (US); Gerald R. Johnson, Hesston, KS (US); Josh W. Russell, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 466 days.

(21) Appl. No.: 12/890,948

(22) Filed: Sep. 27, 2010

(65) Prior Publication Data

US 2012/0079272 A1 Mar. 29, 2012

(51) Int. Cl.
*H04L 29/06* (2006.01)
*G06F 3/0484* (2013.01)
*H04L 29/08* (2006.01)

(52) U.S. Cl.
CPC ........... *H04L 63/0838* (2013.01); *H04L 67/125* (2013.01); *G06F 3/04847* (2013.01); *H04L 63/0435* (2013.01); *H04L 67/34* (2013.01)
USPC ........... 713/168; 713/155; 713/175; 713/191; 726/1; 726/3; 726/11

(58) Field of Classification Search
CPC .................................................. G06F 3/04847
USPC ............................. 713/168, 191; 726/11, 26
See application file for complete search history.

(56) References Cited

U.S. PATENT DOCUMENTS

| 2004/0230815 | A1* | 11/2004 | Goodman et al. | ............ 713/191 |
| 2005/0021982 | A1* | 1/2005 | Popp et al. | .................... 713/184 |
| 2005/0165806 | A1* | 7/2005 | Roatis et al. | .................. 707/100 |
| 2006/0253702 | A1* | 11/2006 | Lowell et al. | ................. 713/156 |

OTHER PUBLICATIONS

A simple query interface for interoperable learning repositories; Simon et al; Proceedings of the 1st Workshop on Interoperability of Web-Based Educational Systems; 8 pages, 2005.*
"SHA Hash Functions" from Wikipedia, http://en.wikipedia.org/SHA_hash_functions, 12 pgs., Apr. 1, 2010.

* cited by examiner

*Primary Examiner* — Jason Lee

(57) ABSTRACT

In one embodiment, a computing apparatus that receives respective unique identifiers corresponding to a machine and a diagnostic tool and a requested parameter setting for configuring a machine component residing in the machine, and provides an authorization code with a payload comprising the requested parameter setting, the payload encrypted based on the unique identifiers.

17 Claims, 10 Drawing Sheets

FIG. 4

| Authorization - Combine Separator Hours Reset v1, Generated XX/XX/XXXX |||
|---|---|---|
| Generated Key | 8ZD3LA-W2VYE3-RUS44K-WQJ ||
| Caller | XYZ Corporation ||
| Dealership | XYZ Dealer ||
| Dealer Code | NA12345 ||
| EDT ID | 8PHTVR ||
| Phone Number | XXX-XXX-XXXX ||
| Email Address | ||
| Effective Date (UTC) | xx/xx/xxxx 12:00:00 AM ||
| Expiration Date (UTC) | xx/xx/xxxx 12:00:00 AM ||
| Source ID | 1 ||
| Notes | ||

Validation Fields

| Name | Value |
|---|---|
| VIN | C60237 |

Data Fields

| Name | Value |
|---|---|
| SeparatorHours_ToSet | 2.0 |
| Area_ToSet | 3 |
| Volume_ToSet | 4 |

Email Key | OK

FIG. 5 ly also referred to simply as authorization systems, which includes apparatus embodiments), which use a single authorization code to carry one or more parameters for a remotely located machine to a computing device comprising a diagnostic tool, the computing device detachably, or electronically, coupled to the machine to set parameter values and/or unlock features. The authorization code is matched to one unique diagnostic tool. In other words, a unique identifier associated with the diagnostic tool is used to create authorization hashes, ensuring that authorizations are not portable between installations of diagnostic tools. The data payload that is secured (e.g., encrypted) in the authorization code may only be decrypted on the diagnostic tool in which the authorized code is destined (e.g., intended destination), since the encryption of the payload (e.g., carrying one or more settings for configuring one or more parameters, including a software or hardware setting, of a machine component) is based on a unique identifier associated with the diagnostic tool.

ONE-TIME USE AUTHORIZATION CODES WITH ENCRYPTED DATA PAYLOADS FOR USE WITH DIAGNOSTIC CONTENT SUPPORTED VIA ELECTRONIC COMMUNICATIONS

BACKGROUND

A requirement for diagnosing and supporting machine (e.g., vehicle) electronic systems is the ability to govern parameters and features inside of the electronic controllers on the vehicle. When vehicle controllers are serviced and/or replaced, there is typically a requirement to set or otherwise configure the controller software settings. Because these settings may have legal, safety, or other critical consequences, the settings should be tracked and governed by the manufacturer.

SUMMARY

In one embodiment, a computing apparatus that receives respective unique identifiers corresponding to a machine and a diagnostic tool and a requested parameter setting for configuring a machine component residing in the machine, and provides an authorization code with a payload comprising the requested parameter setting, the payload encrypted based on the unique identifiers.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 4 is a screen diagram of an example electronic form used to enter data leading up to generation of an authorization code.

FIG. 5 is a screen diagram of an example log screen associated with the provision of an authorization code.

DETAILED DESCRIPTION

Figure 1:
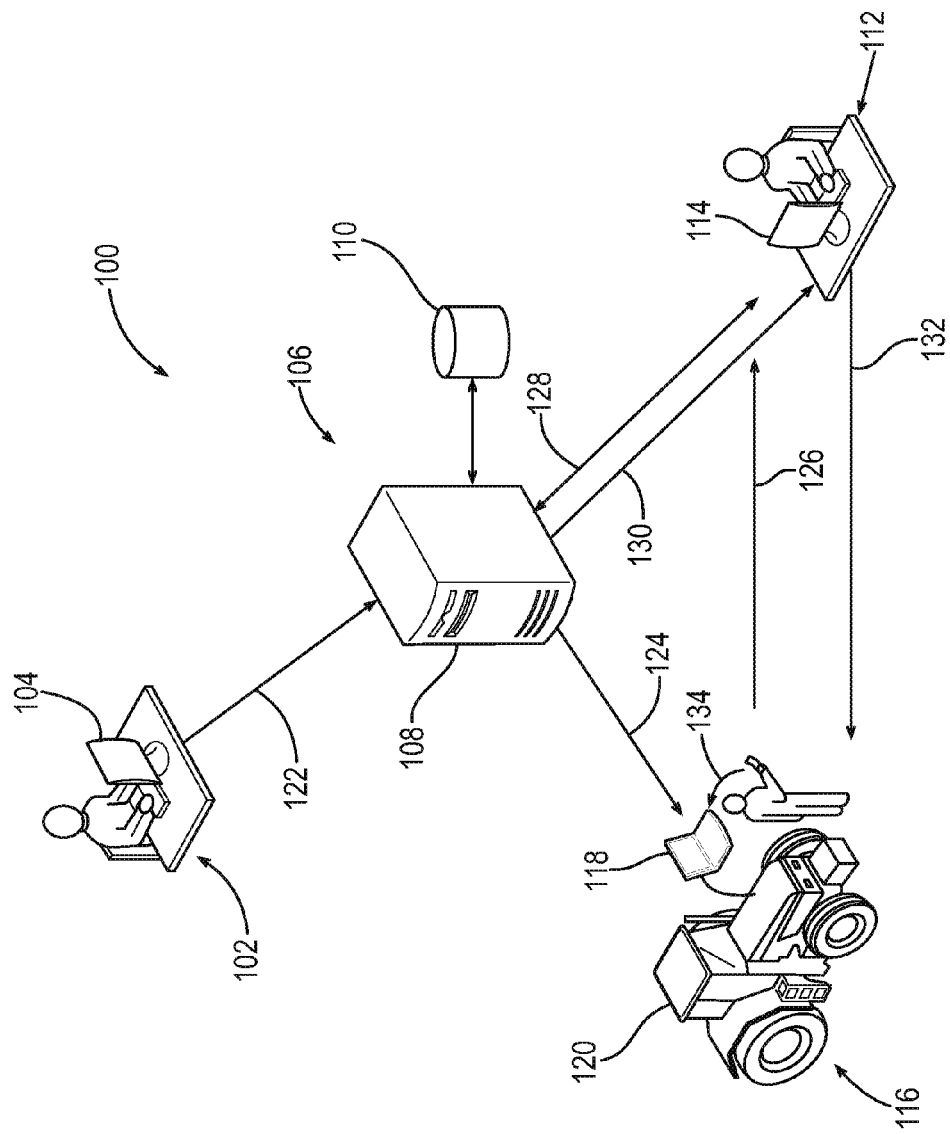
FIG. 1 is a block diagram of an example operating environment in which certain embodiments of authorization systems and methods may be implemented.

Certain embodiments are disclosed herein, referred to as authorization systems and methods (e.g., collectively also The authorization code further supports validation. For instance, an underlying authorization code description, forming the basis for the authorization code, defines data that must match at the machine-diagnostic tool assembly for machine component configuration to proceed. Other features of the authorization code for one or more embodiments are described further below.

In general, the authorization code is configured by certain embodiments of the authorization systems to prevent the proliferation of the authorization code to other installations of the diagnostic tool and/or other machines, hence preventing or mitigating the risk of abuse of an authorization for configuring a machine component, and/or enabling global tracking and governance of machine component parameters.

The following detailed description refers to the accompanying drawings. Wherever possible, the same reference numbers are used in the drawings and the following description to refer to the same or similar elements. While certain embodiments of the disclosure may be described, modifications, adaptations, and other implementations are possible as should be understood by one having ordinary skill in the art in the context of the disclosure. For example, substitutions, additions, or modifications may be made to the elements illustrated in the drawings, and the methods described herein may be modified by substituting, reordering, or adding stages to the disclosed methods.

Although described in the context of an operating environment comprising personnel of a manufacturer, service or manufacturing representative organization, and service organization for the agricultural industry interacting among each other via respective computing devices, it should be understood that other networks, industries, and/or personnel used in the process of controlling access to, and/or configuration of, machine components are contemplated to be within the scope of the disclosure. Further features and/or variations may be provided in addition to those set forth herein.

FIG. 1 is a block diagram of an example operating environment in which certain embodiments of authorization systems and methods may be implemented. It should be understood by one having ordinary skill in the art, in the context of the present disclosure, that the example operating environment illustrated in FIG. 1 is merely illustrative, and should not be construed as implying any limitations upon the scope of the disclosure. In particular, a service network 100 is shown, the service network 100 comprising a diagnostic content author site 102, a central server site 106, a service representative site 112, and a service technician site 116 (also referred to herein as a dealership or dealer). Communication among the aforementioned entities of the service network 100 may be achieved via one or more of wired and/or wireless communication media, including local bus, local area network (LAN), wide area network (WAN), cable, terrestrial, satellite, digital subscriber line, etc.

The diagnostic content author site 102 may correspond to a manufacturer and/or research and development site where a diagnostic content author (e.g., engineer, scientist, etc.) or other personnel uploads, through a computing device 104 (or computing apparatus, where computing device and computing apparatus are used herein interchangeably), diagnostic content corresponding to one or more components of a machine 120 to the central server site 106. The upload also includes authorizations enabling access to, and configuration of, parameters (software and/or hardware settings) associated with machine components of the machine 120 at the service technician site 116. The authorizations include an authorization code description that is used as a basis for generating an authorization code, as explained further below.

The central server site 106 comprises one or more computing devices, such as a computing device 108 (also referred to herein as a server device), which may be configured with server functionality in some embodiments. The computing device 108, in one embodiment, is coupled to (or in some embodiments, integrated with) one or more authorization databases 110 that ultimately receive and store the authorization code descriptions prepared by one or more diagnostic content authors. The central server site 106 may be co-located with the diagnostic content author site 102, the representative site 112, or located elsewhere in the service network 100. The computing device 108 comprises logic (e.g., software or firmware code embodied in a tangible, computer readable medium, such as volatile or non-volatile memory, hardware, or a combination of both) configured to receive the authorization code descriptions and responsively generate an electronic form that may be presented to one or more representatives associated with the representative site 112, the electronic form (described further below) including information provided in the authorization code description. The logic of the computing device 108 is further configured to generate authorization codes based on the authorization code description and information entered in the electronic form, communicate the authorization code to the representative site 112, and log information associated with the generation of the authorization codes and store the log in the authorization database 110.

The representative site 112 is associated with one or more service and/or manufacturer's representatives. For instance, a manufacturer's representative communicates requests sourced from personnel located at the service technician site 116 to the central server site 106 and further requests on behalf of a service technician authorization to access and/or configure secured parameters of machine components of the machine 120. Such parameters include those with legal and/or safety implications, such as maximum speed of a vehicle, engine or vehicle operating hours, engine horsepower, wheel size, harvest hours, electronic vehicle identification, etc. For instance, the manufacturer's representative may field questions or requests raised by a service technician at the service technician site 116 involving configuration of a machine component that requires authorization prior to access. The manufacturer's representative populates, via data entry at the computing device 114, data fields of the displayed electronic form with the information provided by the service technician and receives the proper authorizations (e.g., authorization code) on behalf of the service technician through use of the electronic form. The manufacturer's representative then communicates (e.g., via email, telephone, PDA or other communications devices) the authorization code to the service technician.

The service technician site 116 corresponds to a field site or service facility where the machine 120 is under service. The machine 120 (in this non-limiting example, an agricultural vehicle as shown in FIG. 1) is shown detachably coupled to a computing device 118 that comprises a diagnostic tool configured in software embodied in a tangible computer readable medium (e.g., a software diagnostic tool). Note that in some embodiments, the diagnostic tool may be configured in hardware, or as a combination of hardware and software. Though shown as a wired connection, in some embodiments, the machine 120 and the computing device 118 may be wirelessly coupled. The computing device 118 is configured to receive the authorization code generated by the computing device 108 and communicated by the manufacturer's representative. The computing device 118 writes the requested parameter settings carried in the encrypted payload of the authorization code to the processing logic (e.g., including a processor and memory or memory-type elements, such as registers) in the machine 120 responsive to validation and decryption of the payload, and then encrypts the authorization code and stores the encrypted "used" authorization code in a tamper proof device to prevent further use of the authorization code. By writing the parameter settings to the processing logic of the machine 120, the machine component parameter affected by these settings is configured as agreed upon between the service technician and the manufacturer's representative, with a mitigated (or eliminated) risk of use of the authorization code in other machines or diagnostic tools and mitigated (or eliminated) risk of abuse in configuring the parameter or other secured (e.g., requiring authorization for access and/or configuration) parameters of the machine component.

In view of the description above, an illustration of an example process for configuring combine separator hours-volume-area for the machine 120 is described below in the context of the example operating environment 100 shown in FIG. 1. At 122, the diagnostic content author configures for authorization-only access or configuration parameters (e.g., separator hours) inside the diagnostic content (e.g., updated diagnostic content, such as altered or added data and/or executable code for integration with the diagnostic tool at the service technician site) via an authorization code description and uploads the authorization code description and the diagnostic content (herein diagnostic content and updated diagnostic used interchangeably throughout) to the computing device 108 and/or authorization database 110 at the central server site 106. The diagnostic content may include various diagnostic interfaces to assist in setting parameters or enabling (e.g., activating) functionality of one or more components residing in the machine 120. For instance, the diagnostic content may include one or more diagnostic screens with data fields corresponding to various configurable parameters for one or more machine components of the machine 120. Note that, although 122 is shown or suggested as providing the authorization code description and the diagnostic content as a single upload or transmission, in some embodiments, the authorization code description and the diagnostic content may be sent at different intervals of time (e.g., the authorization code description may be uploaded to the central server site 106 at one instance of time, followed by an upload of the diagnostic content at a later time).

At 124, the computing device 108 pushes the diagnostic content to the diagnostic tool of the computing device 118. The diagnostic content may be pushed to the computing device at any time prior to the configuration of the machine component at issue. The diagnostic tool at the service technician site 116 comprises a framework that implements the diagnostic content. The diagnostic tool comprises a unique identifier that makes it distinguishable from other diagnostic tools associated with the manufacturer. For instance, the diagnostic tool comprises a unique identifier that makes it distinguishable from other diagnostic tools associated with the manufacturer for similar machines 120 and/or the same type of parameter settings. In one embodiment, diagnostic content for a single machine component may be pushed to the computing device 118. In some embodiments, diagnostic content for plural features of a machine component may be pushed to the computing device 118. In some embodiments, diagnostic content for plural machine components may be pushed to the computing device 118.

Assume the service technician has replaced or updated a machine component (e.g., combine separator), and desires to reset separator hours, area, and volume. At 126, the service technician communicates (e.g., over the phone, email, or via other communication mechanisms) a request to the manufacturer's representative for configuring the parameter settings (e.g., hours, area, volume of the combine separator).

At 126, the manufacturer's representative further acquires information from the service technician, such as geographic location, diagnostic tool identification, machine identification (e.g., VIN number), etc., and at 128 verifies (e.g., based at least in part on his or her knowledge of the capabilities of the machine 120) that the parameter settings of the combine separator may be reset as requested, and populates data fields of an electronic form (e.g., a web form) with the acquired information, among other information.

At 130, the authorization code is generated, based on the authorization code description and the information entered in the electronic form, and at 132, the authorization code is communicated (e.g., over the phone, via email, among other approaches) to the service technician. The requested setting is encrypted in the payload, the encryption based on the unique identifiers of the machine (e.g., VIN) and the software diagnostic tool information (e.g., diagnostic tool ID).

At 134, the service technician enters the authorization code at a user interface (e.g., at a keyboard) of the computing device 118, or in the case of electronic communication of the authorization code, the authorization code may be automatically entered (e.g., downloaded) responsive to receiving the authorization code at a communications interface of the computing device 118. The computing device 118 verifies the authorization code. For instance, the computing device 118 may be equipped with, or coupled to, a Controller-Area Network (CAN) transceiver or other suitable device that reads the VIN number off of a CAN network (or other network in some embodiments) residing in the machine 120. Other mechanisms for reading the VIN or other machine identifier may be used in some embodiments. The computing device 118 then decrypts the payload of the authorization code to enable the settings to be applied to the combine separator for configuration. Upon use of the authorization code, the computing device 118 encrypts the authorization code and stores the encrypted, used code in a tamper-resistant medium (or in some embodiments, other storage mediums located proximal to, or remote from, the computing device 118).

Having described the overall processing for an example authorization system, attention is directed to various features involved in the generation of the authorization code. As set forth above, one underlying basis for the authorization code is the authorization code description provided by the diagnostic content author. Below is one example of an authorization code description, formatted in a markup language such as XML (though in some embodiments, other languages may be used), for the combine separator parameters described above as an illustrative example:

```
<?xml version="1.0" ?>
 <AuthorizationCodeDescription
 xmlns:xsi="http://www.w3.org/2001/XMLSchema-instance"
 xmlns:xsd="http://www.w3.org/2001/XMLSchema">
  <ValidationFields>
  <ValidationField>
   <Name>VIN</Name>
   <StringCaseInsensitiveValidationType />
  </ValidationField>
  </ValidationFields>
  <DataFields>
  <DataField>
   <Name>SeparatorHours_ToSet</Name>
   <DecimalDataType MinValue="0" MaxValue="30000"
   ScaleFactor="0.1" />
  </DataField>
  <DataField>
   <Name>Area_ToSet</Name>
   <DecimalDataType MinValue="0" MaxValue="30000"
   ScaleFactor="0.1" />
  </DataField>
  <DataField>
   <Name>Volume_ToSet</Name>
   <DecimalDataType MinValue="0" MaxValue="30000"
   ScaleFactor="0.1" />
  </DataField>
  </DataFields>
  <HashLength>20</HashLength>
  <RandomLength>9</RandomLength>
  <DurationAmount>1</DurationAmount>
  <DurationUnits>Days</DurationUnits>
  <DurationAccuracy>1</DurationAccuracy>
  <Description>This is used to reset separator hours, area and
  volume.</Description>
  <Name>Combine Separator Hours Reset v1</Name>
 </AuthorizationCodeDescription>
```

Figure 2:
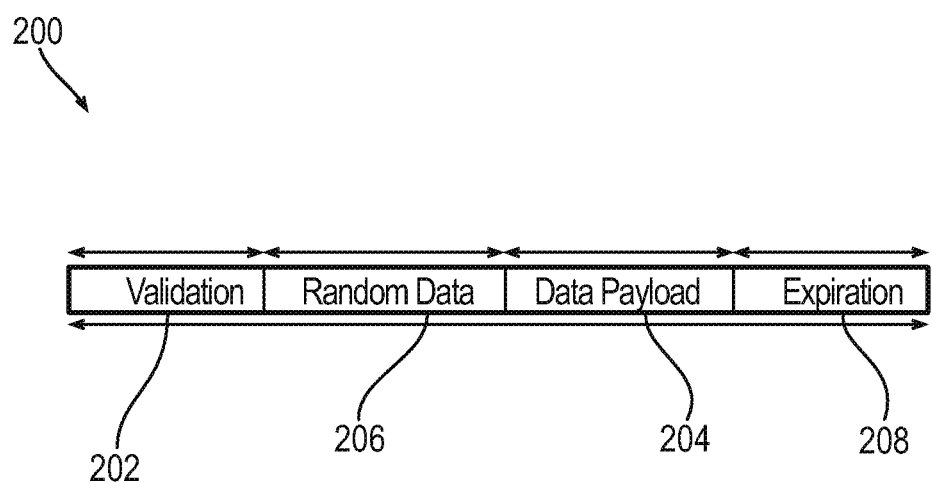
FIG. 2 is a block diagram of an embodiment of an example authorization code.

As noted from above, the authorization code description provides a basis for generating the authorization code. An example embodiment of an authorization code 200 is illustrated in FIG. 2. It should be understood by one having ordinary skill in the art, in the context of the present disclosure, that the example authorization code 200 illustrated in FIG. 2 is merely illustrative, and should not be construed as implying any limitations upon the scope of the disclosure. With continued reference to the example authorization code description described above, the authorization code 200 may be categorized generally into four (4) component parts. One portion of the authorization code 200 includes a validation portion or field 202. The validation field 202 comprises a bit length determined by the hash length, and in this example, provides for the unique machine identification (e.g., the VIN) to be used as the condition for validating the authorization code at the service technician site 116 (e.g., at the system or assembly comprising the diagnostic tool of the computing device 118 detachably coupled to the machine 120). Note that in some embodiments, other unique identifiers (e.g., other than VIN) may be used to validate the use of the authorization code 200 at the service technician site 116.

A second portion or field of the authorization code 200 comprises a data payload field 204 corresponding to one or more parameters and parameter ranges. For instance, as indicated in the example authorization code description noted above, the parameters in this example include the combine separator hours, area, and volume, and corresponding parameter setting ranges allowed by the diagnostic content author (e.g., 0-30000). In some embodiments, the data payload field 204 may further include precision or tolerance information.

A third portion or field of the authorization code 200 comprises a random data field 206. The random data field 206 comprises hash and randomness components that limit the hash length (e.g., twenty characters) of the authorization code and provides for added uniqueness and uniformity in character length of the authorization code, respectively. In some embodiments, the randomness component may be omitted.

A fourth portion or field of the authorization code 200 comprises an expiration field 208 that in one embodiment provides an absolute (e.g., Sep. 19, 20XX, Y hours, Z days, etc.) threshold value, or in some embodiments, a relative (e.g., XX hours, days, etc. from, say, authorization code generation or other event) threshold value, beyond which the authorization code ceases to be effective. For instance, in this example, the threshold is one day, as noted below.

One having ordinary skill in the art should understand, within the context of the present disclosure, that other formats for the authorization code and/or authorization code description may be employed, with the same or different numbers of fields and of different lengths, in some embodiments. For instance, the authorization code 200 comprises a length (e.g., character length) that depends on the encoding used. In one embodiment, a five (5) bit/character encoding scheme may be used, such that if the total length of the authorization code 200 is thirty (30) bits, the resulting authorization code is six (6) characters long.

Figure 3A:
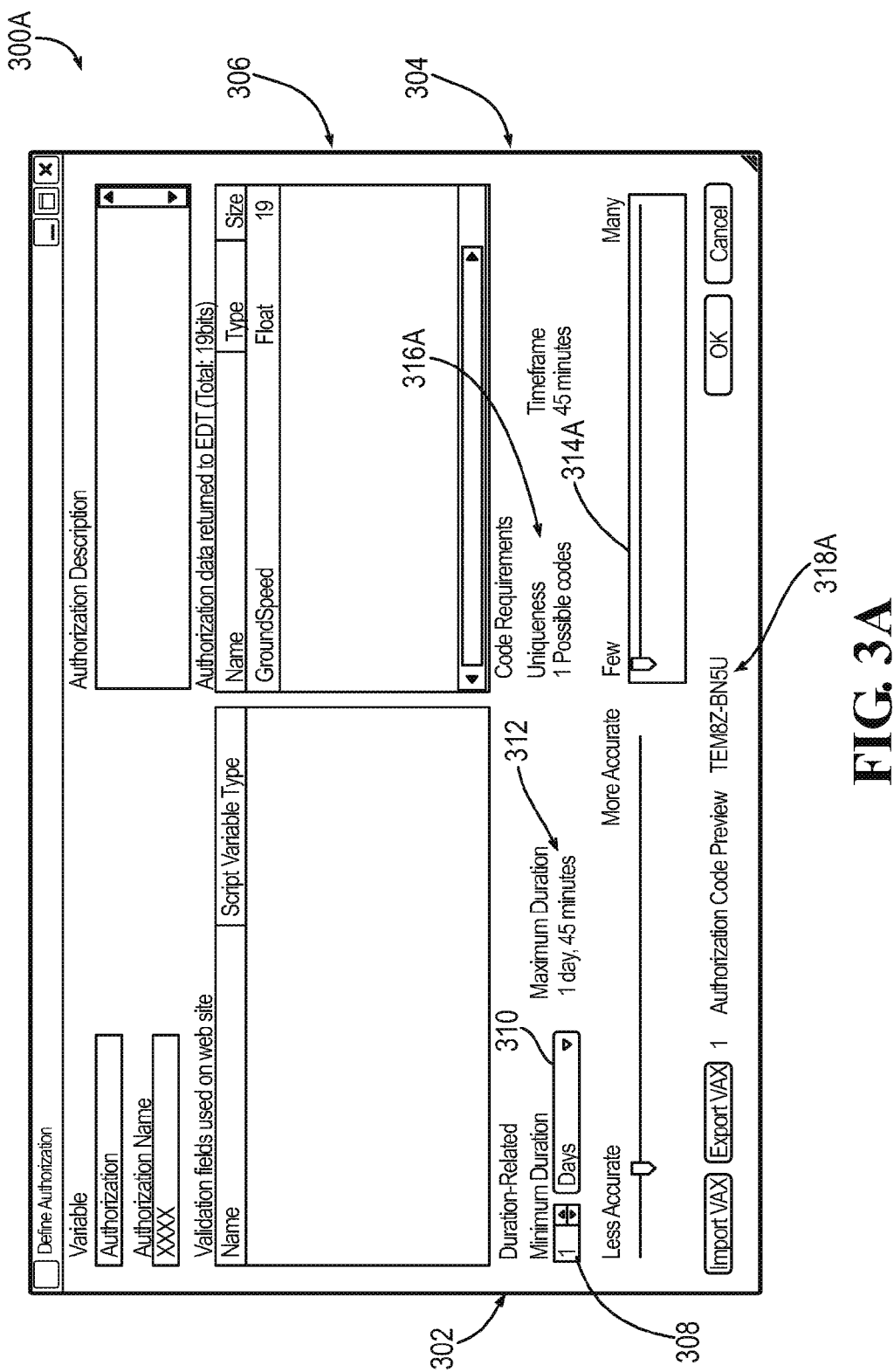
FIGS. 3A-3B are screen diagrams of an embodiment of example graphical user interfaces (GUIs) or web-based electronic forms presented on a screen associated with a computing device that enable selection of randomness and expiration of an authorization code.
Figure 3B:
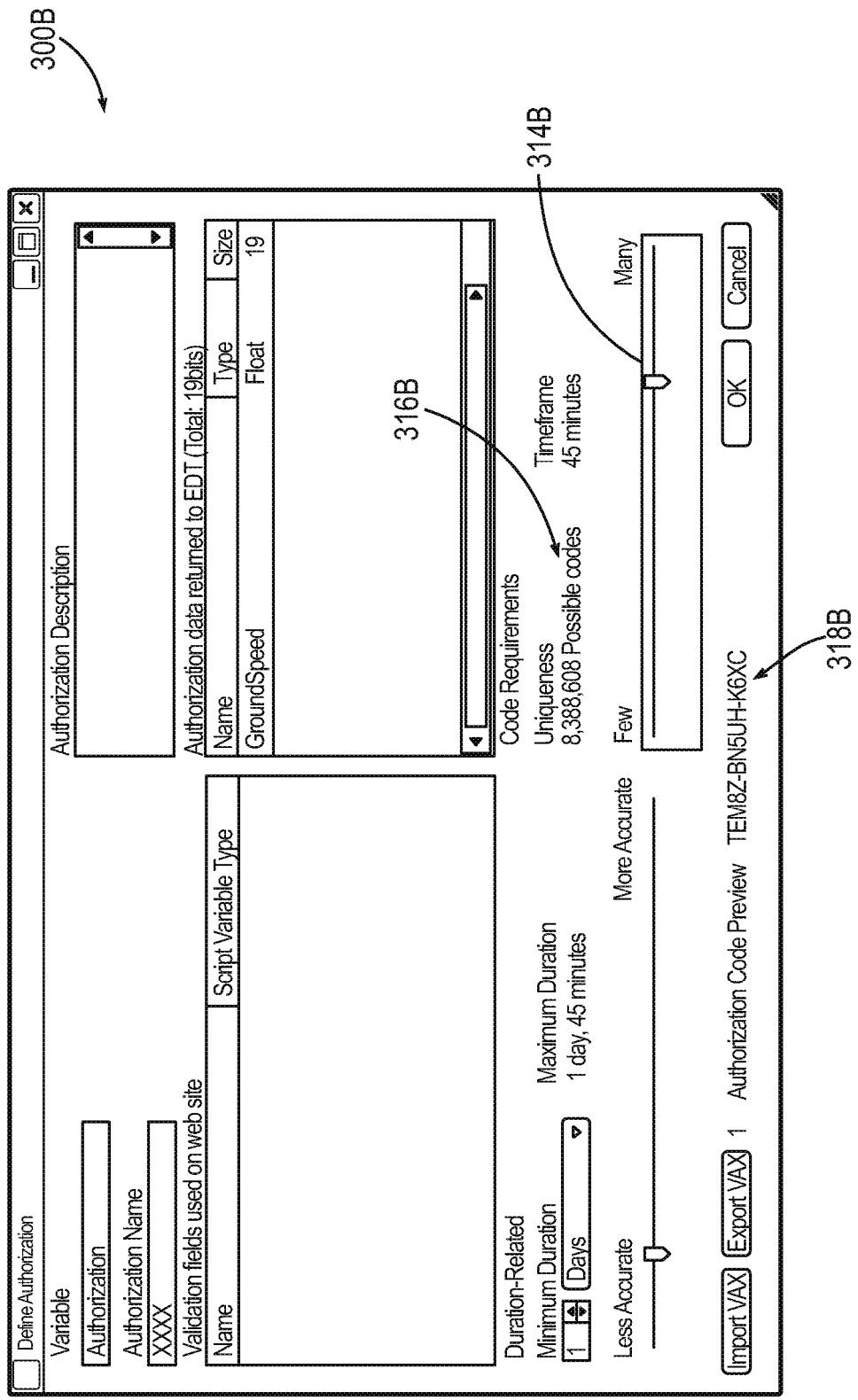

FIGS. 3A and 3B are example screen diagrams that illustrate example graphics user interfaces (GUIs), such as a type employed by the authoring tool used to configure the diagnostic content or web-based electronic forms, involved in the generation of the authorization code description (e.g., via personnel interacting with an interactive display of the computing device 104), and in this particular example, further illustrate how adjustment of the randomness affects the size of the resultant authorization code. It should be understood by one having ordinary skill in the art, in the context of the present disclosure, that the example GUIs or electronic forms (e.g., used interchangeably) illustrated in FIGS. 3A-3B are merely illustrative, and should not be construed as implying any limitations upon the scope of the disclosure. For instance, the web-based forms described herein may be replaced in some embodiments with non-browser based GUIs of an authoring tool or other software, as indicated above. Referring to FIG. 3A, shown is an example electronic form 300A presented on a display screen of the computing device 104, and includes a duration-related block 302, a code requirements block 304, and an authorization data block 306, among other features. The duration-related block 302 corresponds to configuration of the expiration field 208 of the authorization code 200. The code requirements block 304 corresponds to configuration of the random data field 206. The authorization data block 306 corresponds to the data payload field 204.

The duration-related block 302 further comprises configuration controls 308 and 310, and a feedback indicator 312 regarding the configured duration of the authorization (e.g., one day). The value of forty-five (45) minutes, based on this example, signifies the interval of time before another code based on the same data can be issued. A diagnostic content author or other personnel may select from different preconfigured durations via configuration control 310 (e.g., days selected via drop down menu, though other mechanisms for selection are contemplated) and the quantity (e.g., a single day, in this example, though other quantities are selectable via drop down mechanisms) via configuration control 308.

The authorization data block 306 reflects the parameter for which the authorization is employed, and in this example, ground speed is the parameter enabled for configuration.

The code requirements block 304 comprises a configuration control 314A and a uniqueness indicator 316A that reflects the amount of authorization codes that may be issued with the same data (in the 45 minute interval). In this example, the quantity of codes that may be issued is one (1), though the quantity may be increased via increasing the randomness via the configuration control 314A. That is, another code (more than one) cannot issue since the code would be identical to the first one issued and would be blocked since a code cannot be used twice. Note that, though a slide bar is shown, the configuration control 314A may be implemented using other mechanisms (e.g., interactive graphic of a dial, up/down arrows, etc.). Based at least in part on the selected randomness and duration, an authorization code preview 318A (e.g., not the actual authorization code that is used) is generated (e.g., TEM8Z-BN5U), which provides the diagnostic content author with a preview of the expected length of a subsequent authorization code based on modification of these settings.

To counteract the limitation in authorization code generation illustrated in association with FIG. 3A, the uniqueness may be increased (via manipulation of the configuration control 314B to the right as shown in the electronic form 300B in FIG. 3B). By manipulation as shown, the amount of codes available has increased to over eight (8) million possible codes, as shown by the uniqueness indicator 316B in FIG. 3B, and as a result, the authorization code preview 318B is longer (e.g., TEM8Z-BN5UH-K6XC), which indicates the expected length of the authorization code.

Figure 4:
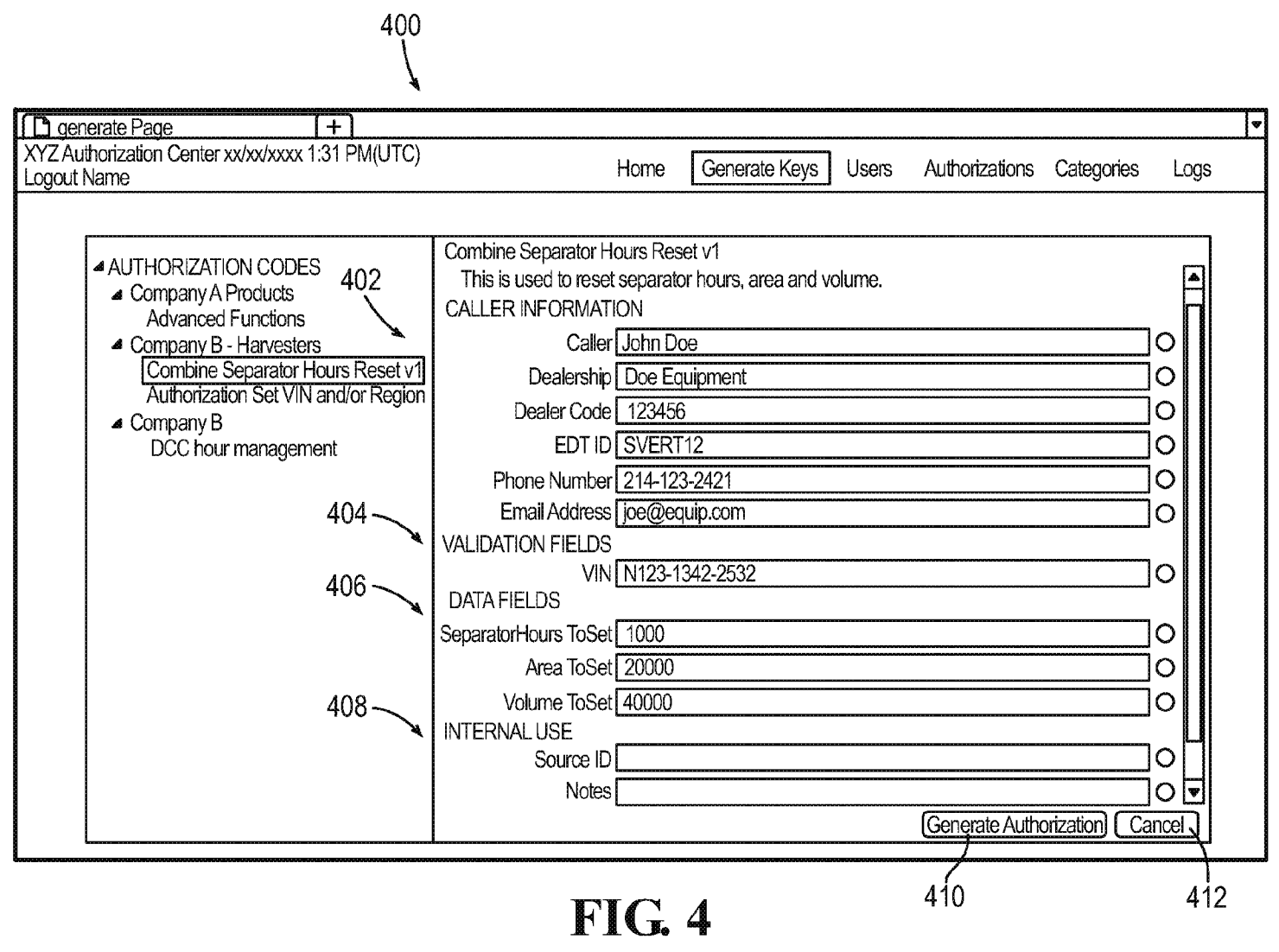

Having described an example authorization code description (and generation thereof) that provides an underlying basis for the generated authorization code, attention is directed to FIG. 4. FIG. 4 is a screen diagram of an example electronic form (e.g., web form) 400 used to enter data preceding the generation of an authorization code. It should be understood that the electronic form 400 shows one example configuration, and that other configurations for an electronic form are contemplated to be within the scope of the disclosure, including fewer or different fields, or non-browser-based GUIs. In one embodiment, the electronic form 400 is generated (e.g., converted) from the authorization code description, with data fields of the electronic form 400 identified based (at least in part) on information present in the authorization code description. The electronic form 400 may be invoked by the manufacturer's representative using, for instance, browser software executing at the computing device 114, and displayed on a display device associated with the computing device 114. Based in part on information exchanged between the service technician and the manufacturer's representative, the manufacturer's representative populates (e.g., enters via keyboard entry or otherwise) plural data fields of the electronic form 400.

The electronic form 400 comprises a caller information section 402, a validation fields section 404, a data fields section 406, and an internal use section 408. Within the caller information section 402 comprises data fields corresponding to information acquired from the service technician site 116, including caller name, dealer name (e.g., associated with the service technician or service technician site 116), dealer code, diagnostic tool identification (e.g., electronic diagnostic tool identification or EDT ID), phone number of the service technician, and email address.

Within the validation fields section 404 comprises the machine identification (e.g., VIN), which is information acquired by the service technician.

Within the data fields section 406 are the fields for the requested (e.g., requested by the service technician) parameter settings corresponding to the parameter(s) (e.g., hours, area, and volume) to be configured for the machine component (e.g., combine separator) upon authorization.

The internal use section 408 comprises a field for inputting the source ID (e.g., an internal issue tracking and contact management system tied to the authorization code).

Upon entry of information in the data fields of the various sections 402, 404, 406, and/or 408, the manufacturer's representative selects the generate authorization button icon 410, or if desired to cancel the process, the cancel button icon 412. Note that selection of the button icons 410 or 412 may be achieved via touch screen mechanisms, or through an intermediate device such as a mouse or keyboard entry.

Referring to FIG. 5, shown is a screen diagram of an example log electronic form 500 associated with the provision of an authorization code. The computing device 108, once generating the authorization code responsive to, for instance, selection of the generate authorization button icon 410, prepares a log (e.g., in the form of a log electronic form 500, or also referred to herein as a log screen) of the events surrounding the provision of the authorization code. The log electronic form 500 may be presented to an operator or other relevant personnel at one or more of the locations of the service network 100. Although an example log electronic form 500 is shown with select information, it should be understood by one having ordinary skill in the art that additional information and/or different information may be included in the log electronic form 500 in some embodiments. The log electronic form 500 is populated with information used in association with the generation of the authorization code, such information stored in one embodiment in the authorization database 110.

The log electronic form 500 comprises a first section 502, a validation fields section 504, and a data fields section 506. The first section 502 comprises data fields pertaining to the generated authorization code, the caller, the dealership, the dealer code, the diagnostic tool identification, the dealer phone number and email address, effective date and expiration of the authorization code, and source identification. The validation fields section 504 presents the machine identification (e.g., VIN). The data fields section 506 comprises the respective identifier of the parameters and the corresponding values in the data fields for the parameter settings.

Figure 6:
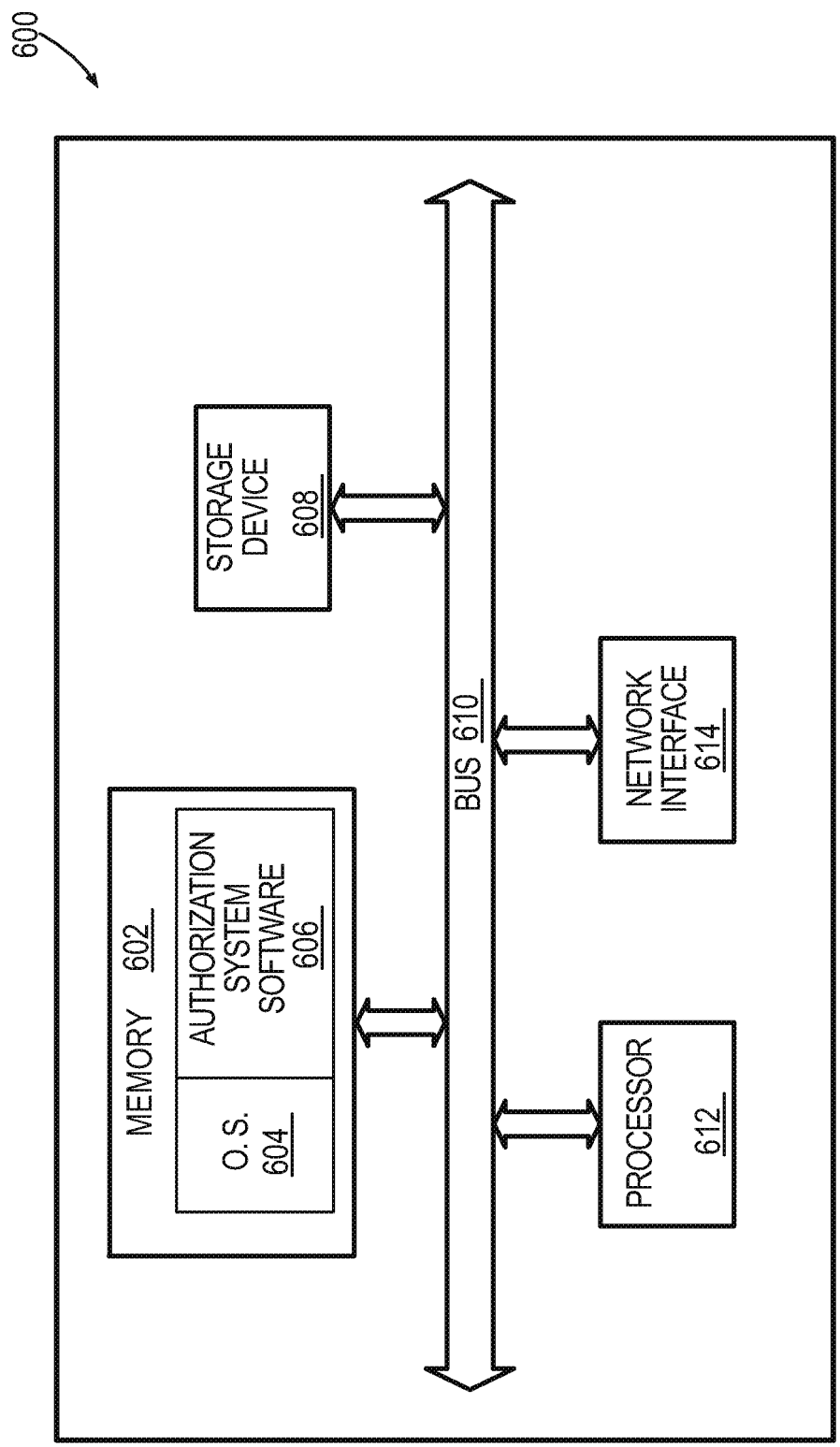
FIG. 6 is a block diagram of an example computing device in which authorization code descriptions or authorization codes may be processed.

FIG. 6 is a block diagram of an example computing device 600 in which authorization code descriptions or authorization codes may be processed. It should be understood by one having ordinary skill in the art, in the context of the present disclosure, that the computing device 600 shown in FIG. 6 is merely illustrative, and should not be construed as implying any limitations upon the scope of the disclosure. The computing device 600 provides a general architecture of the computing devices of the service network 100. In other words, the computing device 600 corresponds in some embodiments to each of the computing devices 104, 108, 114, and 118. The computing device 600 comprises a memory 602 (e.g., a volatile and/or non-volatile tangible medium such as random access memory (RAM), read-only memory (ROM), etc.) encoded with various instructions or executable code (e.g., software and/or firmware), including an operating system (O.S. 604) and authorization system software 606, an optional storage device 608 (e.g., CD, DVD, etc.), a processor 612 (e.g., microcontroller, microprocessor, digital signal processor, etc.), and a network interface 614 configured to enable communication with the network and other devices. The memory 602, storage device 608, processor 612, and network interface 614 are coupled over a bus 610.

In one embodiment, the authorization system software 606, when implemented for instance at the computing device 104 at the diagnostic content author site 102, comprises executable code that enables the generation of the authorization code description and updated diagnostic tool software for implementation at the computing device 118 located at the service technician site 116. In some embodiments, the updated diagnostic tool software may be developed at another device and transferred to the computing device 104 for communication to other locales.

Another embodiment of the authorization system software 606, for instance implemented at the computing device 108 of the central server site 106, comprises executable code that enables the conversion of the authorization code description to the electronic form(s), the generation of the authorization code (including encryption functionality), and the logging of the authorization code process.

Another embodiment of the authorization system software 606, for instance implemented at the computing device 114 located at the representative site 112, comprises executable code that enables access to, and configuration of, the electronic form over the network (e.g., Internet), and the initiation of the authorization code generation process, and communication of the authorization code electronically to other devices, such as the computing device 118 located at the service technician site 116.

In another embodiment of the authorization system software 606, for instance when implemented at the computing device 118 located at the service technician site 116, the authorization system software 606 comprises executable code that enables electronic communication (e.g., reception) of the authorization code, decryption of the authorization code and encryption of the used authorization code, and implementation of the diagnostic software, including the secured features of the diagnostic software awakened or accessed by the decrypted authorization code.

In some embodiments, one or more of the distinct functionality of the authorization system software 606 described above may be combined in a single software package available at one or more of the aforementioned locations and/or computing devices. Further, reference herein to authorization systems may include the entire service network 100, or component parts (e.g., one or a combination of computing devices 104, 108, 114, and 118, or portions thereof, machine component or a machine in combination with one or more of the computing devices). It should be understood that the computing device 600 omits certain features well-known to those having ordinary skill in the art to facilitate a better understanding of the authorization system embodiments.

In some embodiments, certain features of the authorization code software 606 may be implemented via fixed or programmable logic, such as an integrated circuit or field programmable gate array (FPGA), among others.

To the extent certain embodiments of the authorization systems described herein are implemented in software or firmware, executable instructions of the authorization code software 606 are stored in memory 602 or any other suitable tangible computer readable medium and executed by a suitable instruction execution system (e.g., processor 612 alone or in cooperation with the O.S. 604). In the context of this document, a tangible computer readable medium is an electronic, magnetic, optical, or other physical device or means that can contain or store a computer program for use by or in connection with a computer related system or method.

To the extent certain embodiments of the authorization systems or a portion thereof are implemented in hardware, one or more of such features of the authorization code software 606 may be implemented with any or a combination of the following technologies, which are all well known in the art: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Figure 7:
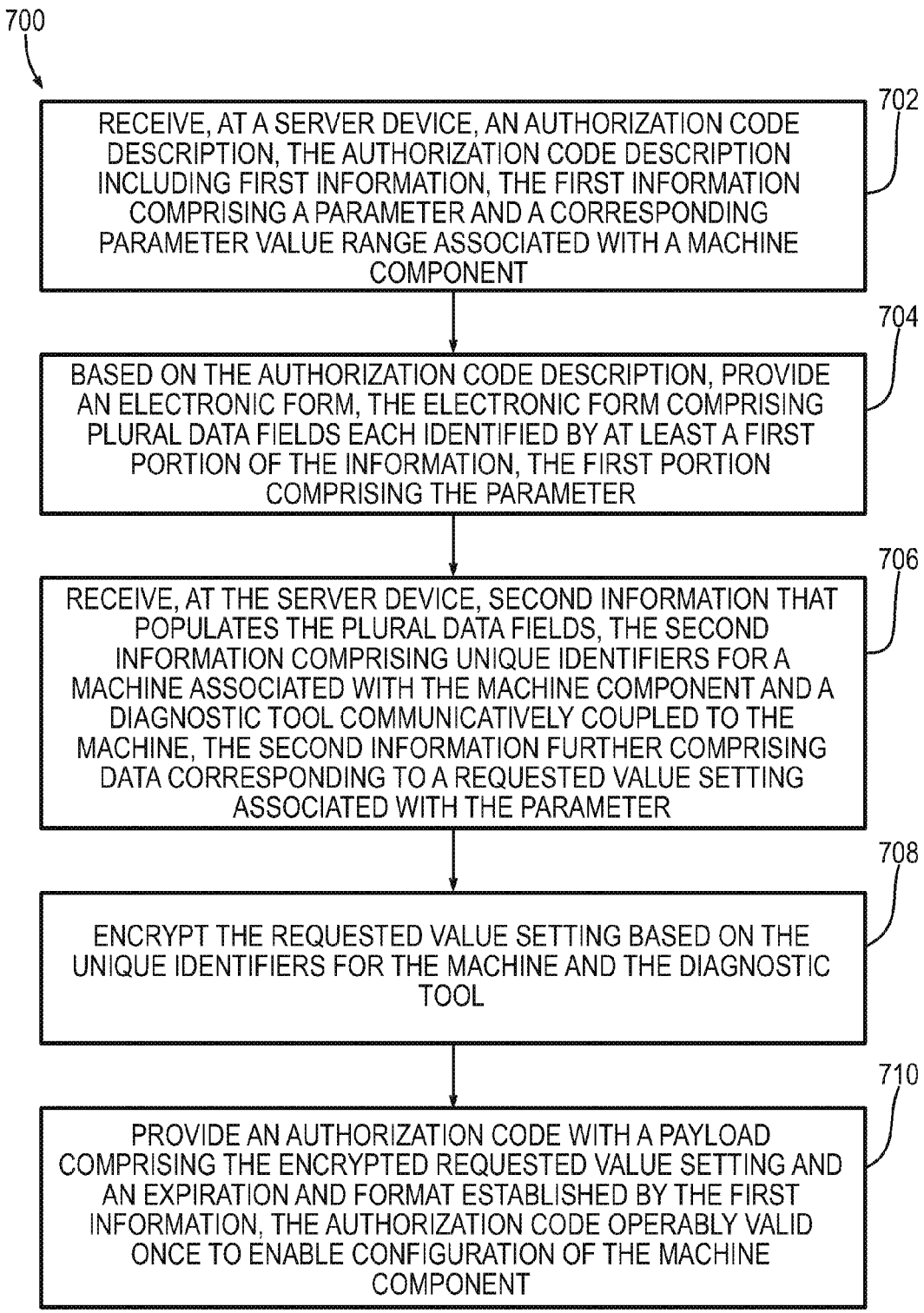
FIG. 7 is a flow diagram that illustrates a method embodiment implemented by an embodiment of an authorization system.

Having described an example network and associated components for an example authorization system, it should be appreciated that one method embodiment 700, implemented by an authorization system configured as the computing device 108 (server device) located at the central server site 106 and illustrated in FIG. 7, comprises receiving, at a server device, an authorization code description, the authorization code description including first information, the first information comprising a parameter and a corresponding parameter value range associated with a machine component (702); based on the authorization code description, providing an electronic form, the electronic form comprising plural data fields each identified by at least a first portion of the information, the first portion comprising the parameter (704); receiving, at the server device, second information that populates the plural data fields, the second information comprising unique identifiers for a machine associated with the machine component and a diagnostic tool communicatively coupled to the machine, the second information further comprising data corresponding to a requested value setting associated with the parameter (706); encrypting the requested value setting based on the unique identifiers for the machine and the diagnostic tool (708); and providing an authorization code with a payload comprising the encrypted requested value setting and an expiration and format established by the first information, the authorization code operably valid once to enable configuration of the machine component (710).

Figure 8:
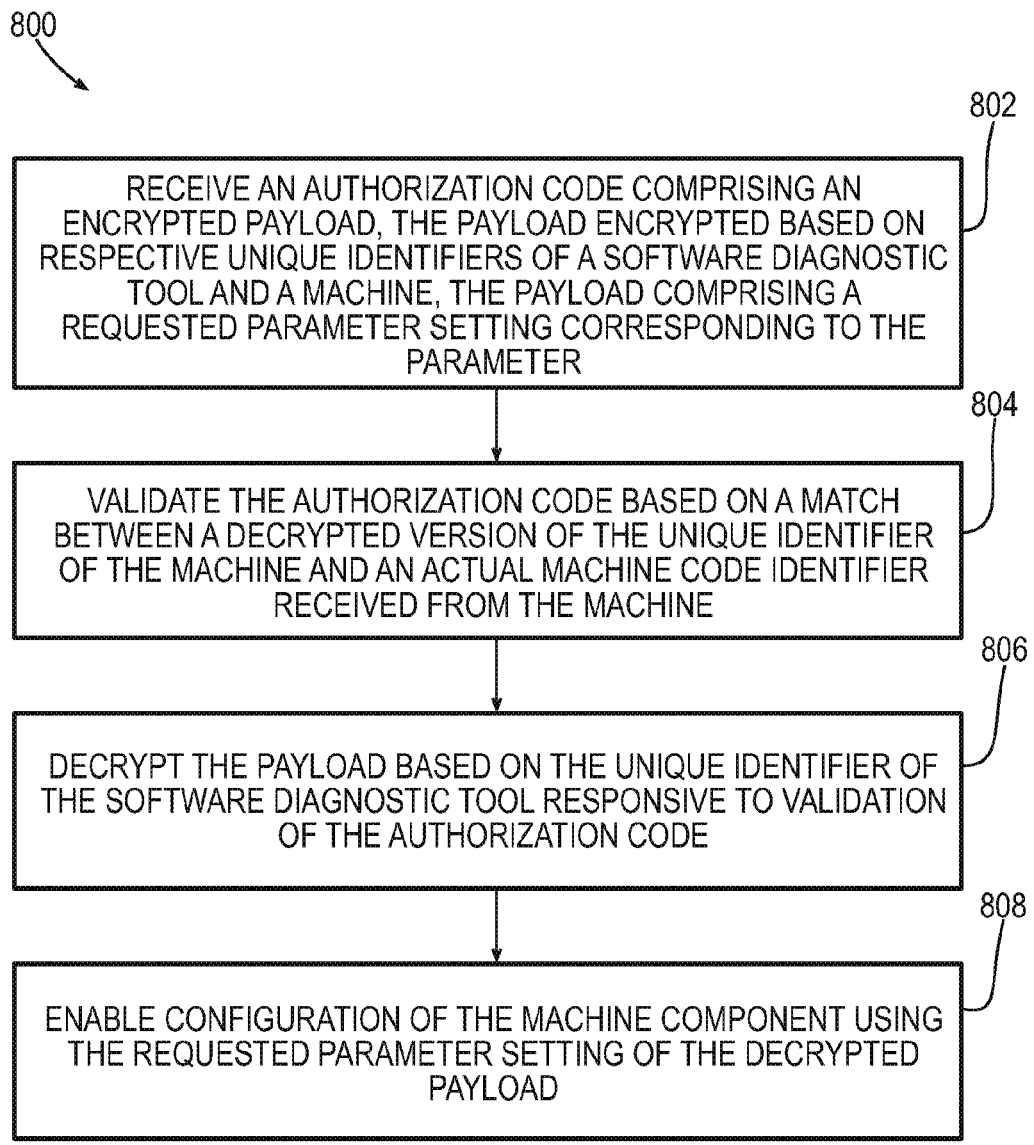
FIG. 8 is a flow diagram that illustrates another method embodiment implemented by an embodiment of an authorization system.

Another method embodiment 800, implemented by an authorization system configured as the computing device 118 located at the service technician site 116 and illustrated in FIG. 8, comprises receiving an authorization code comprising an encrypted payload, the payload encrypted based on respective unique identifiers of a software diagnostic tool and a machine, the payload comprising a requested parameter setting corresponding to the parameter (802); validating the authorization code based on a match between a decrypted version of the unique identifier of the machine and an actual machine code identifier received from the machine (804); decrypting the payload based on the unique identifier of the software diagnostic tool responsive to validation of the authorization code (806); and enabling configuration of the machine component using the requested parameter setting of the decrypted payload (808).

Figure 9:
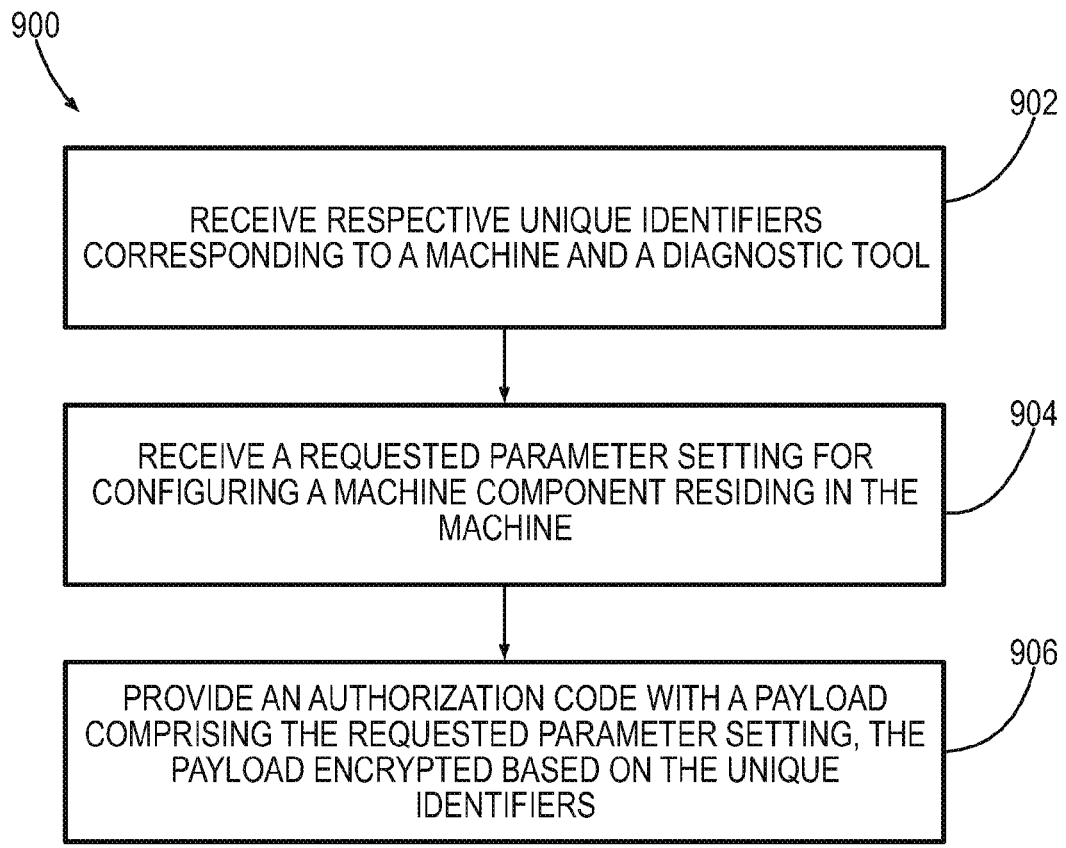
FIG. 9 is a flow diagram that illustrates another method embodiment implemented by an embodiment of an authorization system.

Another method embodiment 900, implemented by an authorization system configured as the computing device 108 located at the central server site 106 and illustrated in FIG. 9, comprises receiving respective unique identifiers corresponding to a machine and a diagnostic tool (902); receiving a requested parameter setting for configuring a machine component residing in the machine (904); and providing an authorization code with a payload comprising the requested parameter setting, the payload encrypted based on the unique identifiers (906).

Any process descriptions or blocks in flow charts or flow diagrams should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art. In some embodiments, steps of a process identified in FIGS. 7-9 using separate boxes can be combined. Further, the various steps in the flow diagrams illustrated in conjunction with the present disclosure are not limited to the architectures described above in association with the description for the flow diagram (as implemented in or by a particular module or logic) nor are the steps limited to the example embodiments described in the specification and associated with the figures of the present disclosure. In some embodiments, one or more steps may be added to one or more of the methods described in FIGS. 7-9, either in the beginning, end, and/or as intervening steps.

It should be emphasized that the above-described embodiments of the present disclosure are merely possible examples of implementations, merely set forth for a clear understanding of the principles of the authorization systems and methods. Many variations and modifications may be made to the above-described embodiment(s) without departing substantially from the spirit and principles of the disclosure. Although all such modifications and variations are intended to be included herein within the scope of this disclosure and protected by the following claims, the following claims are not necessarily limited to the particular embodiments set out in the description.

What is claimed is:

1. A method, comprising:
receiving an authorization code description, the authorization code description being used in defining how to generate a parameter that is to be used in configuring a machine component based on information received regarding the machine component, wherein receiving the authorization code description comprises receiving data indicating one of the following: an absolute threshold value and relative threshold value beyond which the authorization code ceases to be effective;
based on the authorization code description, providing an electronic form, the electronic form comprising plural data fields for receiving the information regarding the machine component;
populating the information regarding the machine component in the plural data fields, the information comprising unique identifiers for a machine associated with the machine component and a diagnostic tool communicatively coupled to the machine;
generating an authorization code based on at least the following: the information populated in the plural data field and the authorization code description, the generated authorization code comprising the parameter that is to be used in configuring the machine component;
encrypting the authorization code;
providing the authorization code with a payload comprising the encrypted parameter, the authorization code operably valid for a single use to enable configuration of the machine component; and
logging the provision of the authorization code.

2. The method of claim 1, wherein receiving the authorization code description further comprises receiving data indicating at least one condition for a proper validation.

3. The method of claim 1, wherein receiving the authorization code description further comprises receiving a random number added to the authorization code.

4. The method of claim 1, wherein providing the electronic form further comprises converting the authorization code description to the electronic form.

5. The method of claim 1, wherein providing the authorization code further comprises eliminating ambiguity between numerical characters of the authorization code and alphabetical characters.

6. A computing device configured to be coupled to a machine comprising a machine component, the computing device comprising:
a storage device encoded with a software diagnostic tool, the software diagnostic tool having secured functionality pertaining to configuration of a parameter of the machine component, the secured functionality inaccessible until authorized; and
a hardware processor configured to execute instructions of the software diagnostic tool to:
receive an authorization code comprising an encrypted payload, the payload encrypted based on respective unique identifiers of the software diagnostic tool and the machine, the payload comprising the parameter pertaining to the configuration of the machine component, the authorization code description comprises one of the following: an absolute threshold value and relative threshold value beyond which the authorization code ceases to be effective;
validate the authorization code based on a match between a decrypted version of a unique identifier of the machine and an actual machine code identifier received from the machine wherein the authorization code operably valid for a single use to enable configuration of the machine component;
decrypt the payload based on a unique identifier of the software diagnostic tool responsive to validation of the authorization code;
enable configuration of the machine component using the parameter of the decrypted payload; and
log the provision of the authorization code.

7. The system of claim 6, wherein the hardware processor is configured to execute instructions of the software diagnostic tool to receive the authorization code from a user interface.

8. The system of claim 6, wherein the hardware processor is configured to execute instructions of the software diagnostic tool to receive the authorization code from communications interface.

9. The system of claim 6, wherein the hardware processor is configured to execute instructions of the software diagnostic tool to provide feedback to a user of the requested parameter setting.

10. The system of claim 6, wherein the hardware processor is configured to execute instructions of the software diagnostic tool to enable by writing the requested parameter setting to the machine component.

11. The system of claim 10, wherein the hardware processor is configured to execute instructions of the software diagnostic tool to:
encrypt the authorization code responsive to writing the requested parameter setting to the machine component; and
store the encrypted authorization code in a tamper-proof device.

12. The system of claim 6, wherein the hardware processor is configured to execute instructions of the software diagnostic tool to read the actual machine code identifier from the machine.

13. A computing apparatus, comprising:
a storage medium encoded with instructions; and
a hardware processor configured to execute the instructions to:
receive an authorization code description, the authorization code description being used in defining how to generate a parameter setting that is to be used in configuring a machine component residing in a machine based on information received regarding the machine component, the authorization code description comprises one of the following: an absolute threshold value and relative threshold value beyond which the authorization code ceases to be effective;
receive respective unique identifiers corresponding to a machine and a diagnostic tool;
receive a request for the parameter setting for configuring the machine component residing in the machine;
provide an authorization code with the requested parameter setting embedded as a component of the authorization code and encrypted based on the unique identifiers, the authorization code enabling a device requesting the parameter setting to configure the machine component by decrypting the authorization code and applying the requested parameter setting embedded within the authorization code wherein the authorization code operably valid for a single use to enable configuration of the machine component; and
log the provision of the authorization code.

14. The computing apparatus of claim 13, wherein the hardware processor being configured receive the authorization code description comprises the hardware processor being configured to receive the parameter setting along with an allowable value range for the parameter setting.

15. The computing apparatus of claim 13, wherein the hardware processor is configured to execute the instructions to configure the authorization code to be operable exclusively for the diagnostic tool associated with a unique diagnostic tool identifier.

16. The computing apparatus of claim 13, wherein the hardware processor is configured to execute the instructions to configure the authorization code to be operable exclusively for the machine associated with a unique machine identifier.

17. The computing apparatus of claim 13, wherein the hardware processor is configured to execute the instructions to provide the authorization code in an electronic format to another device, the authorization code formatted as an alphanumeric.

* * * * *